United States Patent
Deiml et al.

(10) Patent No.: US 12,348,169 B2
(45) Date of Patent: Jul. 1, 2025

(54) METHOD FOR CONTROLLING ELECTRIC MACHINES

(71) Applicant: AVL Software and Functions GmbH, Regensburg (DE)

(72) Inventors: Mathias Deiml, Regensburg (DE);
Klaus Beer, Regensburg (DE);
Matthias Schneck, Regensburg (DE);
Ankit Verma, Regensburg (DE)

(73) Assignee: AVL Software and Functions GmbH, Regensburg (DE)

( * ) Notice: Subject to any disclaimer, the term of this patent is extended or adjusted under 35 U.S.C. 154(b) by 246 days.

(21) Appl. No.: 18/015,601

(22) PCT Filed: Jul. 12, 2021

(86) PCT No.: PCT/EP2021/069267
§ 371 (c)(1),
(2) Date: Jan. 11, 2023

(87) PCT Pub. No.: WO2022/013123
PCT Pub. Date: Jan. 20, 2022

(65) Prior Publication Data
US 2023/0253910 A1    Aug. 10, 2023

(30) Foreign Application Priority Data

Jul. 16, 2020    (DE) .................. 10 2020 118 886.2

(51) Int. Cl.
*H02P 27/08*    (2006.01)
(52) U.S. Cl.
CPC .................... *H02P 27/085* (2013.01)
(58) Field of Classification Search
CPC .. H02P 27/085; H02P 6/10; H02P 8/18; H02P 25/098; H02M 1/14
See application file for complete search history.

(56) References Cited

U.S. PATENT DOCUMENTS

| | | | |
|---|---|---|---|
| 8,680,794 B2 * | 3/2014 | Kazama | B60L 1/003 318/85 |
| 2004/0160201 A1 | 8/2004 | Rahman et al. | |

(Continued)

FOREIGN PATENT DOCUMENTS

| | | |
|---|---|---|
| DE | 1995863 A2 | 11/2008 |
| DE | 102016203044 A1 | 8/2017 |

(Continued)

OTHER PUBLICATIONS

Murmann, Office Action Re: DE102020118886.2, Nov. 2, 2023, 6 pages, Deutsches Patent—und Markenamt, Munich Germany.

(Continued)

*Primary Examiner* — Bickey Dhakal
(74) *Attorney, Agent, or Firm* — Rogue.law; Laura Schneider

(57) ABSTRACT

A first electric machine is controlled by a first pulse-width modulated control signal output by a first inverter and having a first signal parameter, and a second electric machine is controlled by means of a second pulse-width modulated control signal output by a second inverter and having a second signal parameter. The first signal parameter is output from the first inverter to the second inverter via a separate synchronization line. A third pulse-width modulated control signal having a third signal parameter is modulated by the second inverter. The third signal parameter is determined based on the first signal parameter and a predeterminable synchronization parameter. The third pulse-width modulated control signal having the third signal parameter is output by the second inverter to the second electric machine. The first pulse-width modulated control signal and the third pulse-width modulated control signal have a phase relationship predeterminable by the predeterminable synchronization parameter.

17 Claims, 5 Drawing Sheets

(56) References Cited

U.S. PATENT DOCUMENTS

| | | | | |
|---|---|---|---|---|
| 2007/0013325 A1* | 1/2007 | Kiuchi | ............... | H02P 5/74 |
| | | | | 318/801 |
| 2008/0284252 A1* | 11/2008 | Jones | ............... | H02J 3/01 |
| | | | | 307/82 |
| 2012/0153882 A1* | 6/2012 | Hong | ............... | H02P 27/08 |
| | | | | 318/400.26 |
| 2012/0235617 A1 | 9/2012 | Singh | | |
| 2017/0244343 A1 | 8/2017 | Messaoudi et al. | | |
| 2019/0363600 A1 | 11/2019 | Matsumoto et al. | | |

FOREIGN PATENT DOCUMENTS

| | | |
|---|---|---|
| DE | 102018005382 A1 | 7/2019 |
| EP | 3425786 A1 | 9/2019 |
| JP | 2004248495 A | 9/2004 |
| JP | 2017147933 A | 3/2017 |

OTHER PUBLICATIONS

Notice of Reason for Rejection re: Korean Patent Application No. 1020237002900; Sep. 23, 2024; 9 pages; Korean Patent Office; Korea.

Kurisu, Masakazu; Notice of Rejection re: Japanese Patent Application No. 2023-502930; Apr. 10, 2024; 4 pages; Japanese Patent Office; Japan.

English Machine Translation of: Kurisu, Masakazu; Notice of Rejection re: Japanese Patent Application No. 2023-502930; Apr. 10, 2024; 4 pages; Japanese Patent Office; Japan.

Dr. Kraus, Office Action Re: DE102020118886.2, Feb. 23, 2021, 8 pages, Deutsches Patent—und Markenamt, Munich Germany.

Wenyan Zeng, International Search Report and Written Opinion Re: PCT/EP2021/069267, Oct. 19, 2021, 9 pages, European Patent Office, Rijswijk Netherlands.

* cited by examiner

METHOD FOR CONTROLLING ELECTRIC MACHINES

This application is a 371 US National Stage Entry of Application No. PCT/EP2021/069267, filed Jul. 12, 2021, and entitled "METHOD FOR CONTROLLING ELECTRIC MACHINES", which claims priority to German Application No. 10 2020 118 886.2, filed Jul. 16, 2020 and entitled "VERFAHREN ZUR ANSTEUERUNG VON ELEKTRISCHEN MASCHINEN," the entire disclosures of which are hereby incorporated by reference for all proper purposes.

DESCRIPTION

The invention relates to a method for controlling at least two electric machines arranged in a vehicle, preferably electric motors, and to a system for carrying out such a method.

Electric vehicles are known from the prior art which have a single electric motor of any type which serves as a drive unit for the vehicle. In addition, solutions are also known in which several electric motors are arranged simultaneously in an electric vehicle as drive units. In particular, arrangements of separate electric motors on the axles of the electric vehicle, so-called axle drives, or of separate electric motors that are installed in the wheels of the electric vehicle, so-called wheel hub motors should be mentioned in this context.

Usually, individual electric motors each have a separate inverter, which converts a DC voltage from a DC voltage source, such as a battery or a fuel cell, into an AC voltage for operating the electric motor. For example, corresponding inputs of a driver from a superordinate engine controller as power signals which comprise data relating to the power to be provided by the electric motor are output to the individual inverters, which output a control signal to the electric motors to be controlled in response thereto. It is known here that these control signals are output in the form of pulse-width modulated signals (PWM signals).

The aforementioned pulse-width modulated control signals, which are output by the inverters to the electric motors, run, concerning the time scale, freely relative to one another, or to one another, wherein a (temporal) offset (also referred to as phase shift) is varied and is not controlled. This results in random congruence or phase shifts of the individual control signals relative to one another. In this context, high ripple currents (current ripple factor) can occur, particularly in the case of high congruence or low phase shift of the PWM signals. High ripple currents are problematic in particular for the battery/fuel cell and the rest of the onboard power supply system, since a power loss that is converted into heat is generated via the equivalent series resistance (ESR). Therefore, the overall systems or the individual components must be designed in such a way that they are functional at the occurring ripple voltages and remain so for a longer period of time.

It is therefore the object of the present invention to provide a method and a corresponding system by means of which the aforementioned disadvantages of the prior art can be eliminated.

This object is achieved by a method having the features of claim 1 and a system according to claim 10.

The core idea of the invention is a method for controlling at least two electric machines arranged in a vehicle, preferably electric motors, comprising the steps of:

a) Receiving a power signal output by a superordinate control device by a first inverter and at least one second inverter;
b) Outputting a first pulse-width modulated control signal having a first signal parameter by the first inverter to a first electric machine and at least one second pulse-width modulated control signal having a second signal parameter by the at least one second inverter to at least one second electric machine, wherein the control signals are modulated based on the power signal;
c) Outputting at least one synchronization signal comprising the first signal parameter by the first inverter to the at least one second inverter;
d) Modulating at least one third pulse-width modulated control signal having a third signal parameter by the at least one second inverter, wherein the third signal parameter is determined based on the first signal parameter and a predeterminable synchronization parameter;
e) Outputting the at least one third pulse-width modulated control signal having the third signal parameter by the at least one second inverter to the at least one second electric machine, wherein the first pulse-width modulated control signal and the at least one third pulse-width modulated control signal have a phase relationship that can be predetermined by the predeterminable synchronization parameter.

The method serves to control at least two electric machines arranged in a vehicle, wherein the exact number is variable. The method is preferably used for controlling at least three electric machines, more preferably at least four electric machines and particularly preferably at least six electric machines. The electric machines are preferably electric motors. This applies analogously to the inverters, wherein preferably at least three inverters, more preferably at least four inverters, and particularly preferably at least six inverters are provided. Preferably, the electric motors are designed as alternating current motors or three-phase motors, wherein it is particularly preferably a synchronous motor or an asynchronous motor. Further preferably, the electric machines controlled by the method are arranged in an electric vehicle or a hybrid vehicle with a combustion and electric motor, wherein the vehicle can be, for example, a passenger car or a truck. Preferably, the electric machines represent the drive unit of the vehicle and are preferably each mechanically connected to an axis of the vehicle (axis drive) or installed in a wheel of the vehicle (wheel hub motor). Preferably, each electric machine is controlled by means of a separate inverter, or is connected to its own inverter at least in terms of signal technology, preferably power-electronically.

The superordinate control device according to the invention can, for example, be an engine controller which, among other things, takes over the control, regulation and monitoring of engine functions, or an inverter controller which specifically controls the inverters. These may preferably be microprocessors or microcontrollers.

Preferably, the superordinate control device receives, among other things, the inputs from a driver, such as switching on or a required power, and, by means of a power signal, forwards these inputs to the electric machine or to the inverter, which provides the AC voltage for operating the electric machine, starting from the DC voltage of a DC voltage source, such as a battery or a fuel cell. Such a power signal, which is sent by the superordinate control device to an inverter which controls/operates the electric machine, generally comprises the data or parameters which the inverter requires to output a corresponding control signal to the electric machine and comprises, for example, an indication of the required power/load which the electric machine is to provide and which the inverter converts to the control signal, or already parameters for the control signal, such as a frequency, a duty cycle, a period duration or the like. Consequently, the first control signal and the at least one second control signal are modulated on the basis of the power signal or the data which comprises the power signal, wherein this is a known pulse-width modulation (see below).

An inverter according to the invention is preferably connected at least in terms of signal technology, preferably in terms of power electronics, to an electric machine, a voltage source, preferably a DC voltage source, such as a battery or a fuel cell, and at least in terms of signal technology to the superordinate control device. A power electronics connection is understood to mean a connection by means of which a power is also transmitted to the signal or along with the signal. Preferably, the inverter is an inverter known from the prior art, which is suitable for providing the DC voltage of the voltage source into an AC voltage for operating the electric machine.

A pulse-width modulated control signal according to the invention is understood to mean a signal which is transmitted from the inverter to the electric machine, which is thus connected at least in terms of signal technology, preferably in terms of power electronics and is designed to control the electric machine, wherein a power generated by the electric machine is set or controlled via the pulse-width modulated control signal. Pulse Width Modulation (PWM) is a modulation type in which a voltage, a current or the like changes at a fixed frequency between two fixed values. The information to be transmitted is accommodated in the duty cycle. A period of the pulse-width modulation consists of the pulse and the pause. The degree of modulation is expressed in percent in the duty cycle of the pulse length to the cycle duration (pulse+pause). Usually, one of the two edges of the PWM signal is fixed, while the position of the other edge is variable by the modulation. Thus, a PWM signal can be generated with a modulation starting from a stationary edge, ("edge aligned", e.g., the left edge/rising edge or the right edge/falling edge ("right aligned"), or, starting from a center point of the signal, both edges being modulated ("center aligned"). Therefore, at least one reference point must be known for the pulse-width modulation, wherein the reference points are preferably a time at which the corresponding edge or center point of the signal occurs. The generation and application of pulse-width modulated signals is sufficiently known to a person skilled in the art from the prior art, which is why they are not to be discussed in more detail here.

In this case, a signal parameter is understood to mean a characteristic parameter of the associated pulse-width modulated control signal. Preferably, the PWM signal is a voltage that changes between two values in time. Further preferably, the signal parameter can be a point in time at which an edge or a center point of the PWM signal occurs (a position of an edge or the center point, so to speak), a duty cycle/pulse duty factor, a period duration, a pulse duration, a pause duration, a voltage, a current and/or a frequency.

The predeterminable synchronization parameter according to the invention reflects a phase shift, also called phase difference or phase angle, which is to be present between the first pulse-width modulated control signal and the at least one second pulse-width modulated control signal. This is preferably a phase shift angle, a phase shift time, a phase shift length or the like. Thus, the third signal parameter of the third pulse-width modulated control signal can preferably be determined or calculated based on the first signal parameter of the first pulse-width modulated control signal and the predeterminable synchronization parameter, and the at least one third pulse-width modulated control signal can be output by the at least one second inverter instead of the at least one second pulse-width modulated control signal, while the first inverter further outputs the first pulse-width modulated control signal having the first signal parameter and thus the first pulse-width modulated control signal and the at least one third pulse-width modulated control signal have a predeterminable phase relationship. In this case, the synchronization parameter is predeterminable or adjustable and can preferably be changed as desired, even during the operation of the vehicle or the electric machines, as a result of which the desired phase shift between the first pulse-width modulated control signal and the at least one second pulse-width modulated control signal can be variably adjusted by the output of the at least one third control signal with the third signal parameter instead of the output of the at least one second control signal with the second signal parameter.

By means of the method according to the invention, the phase shift or the phase relationship between a pulse-width modulated control signal output by a first inverter and at least one pulse-width modulated control signal output by at least one second inverter can thus be adjusted, which is referred to as synchronization according to the invention. This has the advantage that, as a result, intermediate circuit currents are distributed over the period of the PWM signals, resulting in a higher effective frequency which accommodates an intermediate circuit capacitor. This in turn results in a lower intermediate circuit capacitance being required, preferably only half the intermediate circuit capacitance, and the occurring ripple currents being significantly reduced in comparison with pulse-width modulated control signals running freely relative to one another. Thus, the ripple load in the on-board electrical system and the demands on the capacitor are reduced, whereby component costs can be saved.

Consequently, the first inverter can be referred to as "master", which outputs its first signal parameter to the at least one second inverter, the so-called "slave". In this case, the master inverter can be set once, for example during the production of the vehicle, or the master or slave position is newly assigned when the vehicle is switched on. This can take place, for example, by transmitting a corresponding master signal from an inverter to the other inverters that this current master inverter is present. The slave inverters or the at least one second inverter preferably adhere to the specifications of the master inverter or of the first inverter.

According to a preferred embodiment, the predeterminable synchronization parameter is present as stored information that can be retrieved by the at least one second inverter. Preferably, the predeterminable synchronization parameter is output by the superordinate control device to the at least one second inverter. The inverter preferably comprises a memory unit or can access a memory unit on which the synchronization parameter is stored. This synchronization parameter can preferably be set variably and can be changed. Further preferably, the superordinate control device comprises a memory unit or can access a memory unit on which the synchronization parameter is stored and can transmit it to the at least one second inverter. This synchronization parameter can preferably be set variably. The synchronization parameter can preferably be available as stored information for the at least one second inverter or can be output directly from the superordinate control device to the at least one second inverter (for example via the power signal which can comprise the synchronization parameters), or possibly also indirectly via the first inverter, which transmits the synchronization parameter via the synchronization line to the at least one second inverter by means of the synchronization signal. In this way, depending on the situation, the phase relationship or shift can be adjusted by setting the synchronization parameter and thus the ripple current can be correspondingly reduced.

According to a preferred embodiment, a plurality of synchronization parameters is present as retrievable stored information, wherein the synchronization parameters used for determining the third signal parameter are selected from the plurality of synchronization parameters as a function of the power signal and/or the first pulse-width modulated control signal and/or the second pulse-width modulated control signal. Preferably, the second inverter, the first inverter and/or the superordinate control device can select from the plurality of stored synchronization parameters for determining the third signal parameter. Preferably, the synchronization parameter used for determining the third signal parameter is selected from the plurality of synchronization parameters as a function of the power signal and/or the first and/or the second pulse-width modulated control signal. Further preferably, the synchronization parameter for determining the third signal parameter from the plurality of synchronization parameters is selected as a function of the power or the load of the electric machine, wherein the power or load of the electric machine is determined via the power signal and/or the pulse-width modulated control signal. Further preferably, the synchronization parameter for determining the third signal parameter from the plurality of synchronization parameters is dependent on the frequency, duty cycle, and/or voltage specified to the inverter by the power signal and/or output from the inverter to the electric machine by the pulse-width modulated control signal, which preferably determine the power of the electric machine. It has been found that a synchronization parameter or a value for the synchronization parameter, which results in a minimum ripple current, is present for each power or load and accordingly the duty cycle, frequency and/or voltage. Therefore, it is conceivable for a synchronization parameter to be determined for each power/load or each duty cycle, each frequency, each voltage and/or corresponding ranges in advance, preferably by experiments (e.g. on a test bench) and/or by simulation, which synchronization parameter causes a minimum ripple current in the power/load or the duty cycle, the frequency and/or the voltage, wherein these synchronization parameters are stored retrievable for the second inverter, the first inverter and/or the superordinate control device. In this way, a plurality of stored synchronization parameters can be obtained, which can also be referred to as reference values, which can be selected depending on the power signal and/or the first and/or the second pulse-width modulated control signal, wherein the selection of the synchronization parameter is preferably carried out as a function of the duty cycle, the frequency and/or the voltage of the pulse-width modulated control signal or of the duty cycle, the frequency and/or the voltage provided for the pulse-width modulated control signal. It can thus advantageously be assumed that a predetermined synchronization parameter is assigned and/or will be assigned to each duty cycle, each frequency and/or each voltage or each predetermined range of the duty cycle, the frequency and/or the voltage. In this context, the selection of a synchronization parameter from the plurality of synchronization parameters for determining the third signal parameter can preferably be understood as specifying the synchronization parameter.

According to a preferred embodiment, the signal parameters and the synchronization parameter represent a time value, wherein the signal parameters each indicate a time of an edge, or a center point of the corresponding pulse-width modulated control signal and wherein the synchronization parameter specifies a phase shift time or a phase shift angle. Preferably, the phase shift time and the phase shift angle can be converted into one another in a known manner (phase shift angle/360°=phase shift time/period duration). Thus, the third signal parameter can be determined in a simple manner on the basis of the first signal parameter and the synchronization parameter.

Preferably, the determination of the third signal parameter takes place, based on the first signal parameter and the predeterminable synchronization parameter, by means of an addition of the time point indicated by the first signal parameter and the phase shift time indicated by the synchronization parameter. It can preferably be provided that the phase shift angle which the synchronization parameter can reproduce is first converted into the phase shift time.

According to a preferred embodiment, the phase shift angle has a value in the range of ±180° or a value in the range of ± (90° to 120°). Furthermore, it would be conceivable for the phase shift angle to have a value in the range of ±π (pi). Within the mentioned angular ranges of the phase shift angle of the synchronization parameter, the resulting ripple currents can be effectively reduced. It has been shown that a minimum for the resulting ripple currents can be achieved in these angular ranges.

According to a preferred embodiment, and as illustrated in FIG. 4, the phase shift time indicated by the synchronization parameter is divided into at least two phase shift time sections, wherein steps d) and e) for each of the at least two phase shift time sections are performed individually one after the other in order to ensure a stepwise transition from the at least one second pulse-width modulated control signal to the at least one third pulse-width modulated control signal. The greater the phase shift time or the phase shift angle, the more phase shift time sections the latter are divided into, in order to ensure as gentle a transition as possible from the at least one second pulse-width modulated control signal to the at least one third pulse-width modulated control signal and to prevent an abrupt signal change and corresponding power change of the at least one second machine.

According to a preferred embodiment, the first inverter and the at least one second inverter each have a clock generator CG1, CG2, wherein the clock generator CG2 of the at least one second inverter is tuned based on the first signal parameter and the synchronization parameter before, during or after step d), in order to ensure a synchronous clock of the first inverter and of the at least one second inverter for outputting the pulse-width modulated control signals. A clock generator specifies the working frequency of processors and a clock-dependent peripherals and is known from prior art. By tuning the clock generator of the at least one second inverter based on the first signal parameter and the synchronization parameter, its working frequency can be tuned or synchronized to the working frequency of the first inverter or the clock generator of the first inverter.

According to a preferred embodiment, the synchronization signal is output from the first inverter to the at least one second inverter via a separate synchronization line, which connects the first inverter and the at least one second inverter in terms of signal technology. The separate synchronization line is preferably a push-pull line, a single-ended line, or a radio link. Particularly preferably, the synchronization line is a connection which enables communication between the first inverter and the at least one second inverter in the nanosecond range. Further preferably, a bidirectional connection between the first inverter and the at least one second inverter is established via the separate synchronization line. In this way, signals can be transmitted from the first inverter to the at least one second inverter and vice versa, as a result of which, for example, a so-called handshake can be carried out and the existing inverters recognize one another and possible defects at the synchronization line would be detectable, error messages can be transmitted. It would also be conceivable for the separate synchronization line to be used exclusively for transmitting the synchronization signal.

Preferably, the first inverter (master) is connected to the at least one second inverter (slave) or to each existing second inverter (slaves) via a separate synchronization line, at least in terms of signal technology, whereby the first inverter can output the synchronization signal individually to each provided second inverter via the respective synchronization line (direct synchronization signal transmission). Consequently, the first inverter would therefore be connected to each second one, at least in terms of signal technology, via a separate synchronization line, wherein the present second inverters would not be connected to one another in terms of signal technology by means of a synchronization line. In this way, a fast and simple signal transmission can be made possible. However, it would also be conceivable for the first inverter to be connected in terms of signal technology only to a second inverter or to two second inverters by means of a synchronization line, and for the second inverters to be connected to one another in terms of signal technology by means of at least one, preferably at least two, more preferably exactly two further second inverters via a separate synchronization line. Thus, the synchronization signal could be output from the first inverter to the second inverter, which is connected thereto in terms of signal technology by the synchronization line, and via the second inverter to the at least one further second inverter, which is connected thereto in terms of signal technology via the synchronization line (indirect synchronization signal transmission), wherein the synchronization signal in each case comprises the first signal parameter of the first pulse-width modulated control signal. In this way, material and costs could be saved. Furthermore, it would also be conceivable for the synchronization line to be designed as a radio link, wherein each existing inverter has a corresponding transceiver unit by means of which the synchronization signal can be output and/or received.

Preferably, when the vehicle is switched on, a handshake, preferably by means of an output of an initialization signal, can take place between the existing (first and second) inverters via the respectively provided synchronization lines, wherein, when a non-possible handshake is determined by an inverter with a connected inverter, an error message is output to the superordinate control device that no handshake is possible via the corresponding synchronization line and thus no synchronization can occur. Consequently, an error message from two inverters connected via a synchronization line that no handshake or no transmission of an initialization signal is possible could lead to the conclusion that the corresponding synchronization line is defective. In the presence of a defective synchronization line, attempts could preferably be made to transmit the synchronization signal to the respective inverter(s) via an indirect synchronization signal transmission. Further preferably, a handshake or an initialization signal transmission between the designated inverters takes place before or during step a).

According to a preferred embodiment, steps b) and c) take place simultaneously or immediately one after the other. In this way, it can be ensured that the first inverter and the at least one second inverter are transferred as quickly as possible into a synchronous state or the phase relationship between the first PWM control signal and the at least one third PWM control signal is set.

According to a preferred embodiment, the first inverter is operated at an adjustable switching frequency which is detected by the at least one second inverter and is adopted by the latter. In this way, on the one hand, the switching frequency of the first inverter or the circuit breakers of the first inverter can be variably adjusted, wherein the at least one second inverter detects the switching frequency of the first inverter, preferably detected by means of a suitable sensor, and adopts the detected or detected switching frequency of the first inverter itself or switches with the switching frequency of the first inverter. The variable adjustment of the switching frequency of the first inverter can preferably take place with a switch control strategy, wherein corresponding switching control strategies with variable frequencies are known from the prior art. Thus, synchronization with regard to the frequency of the control signals of the inverters can also be ensured.

Furthermore, the object is achieved by a system for carrying out a method according to one of claims 1 to 9, comprising a first and at least one second electric machine, a superordinate control device, a first inverter and at least one second inverter, wherein the first inverter and the at least one second inverter are connected in terms of signal technology via a separate synchronization line.

The above statements and features relating to the method according to the invention are also intended to apply mutatis mutandis to the system according to the invention and vice versa.

Further advantageous embodiments result from the dependent claims.

Further objectives, advantages and expediencies of the present invention can be found in the following description in conjunction with the drawings. The drawings show:

FIG. 1 a system according to a preferred embodiment of the invention;

FIGS. 2a-d various system sections according to preferred embodiments of the invention;

FIG. 3 a flowchart of a method according to a preferred embodiment of the invention.

Figure 1:
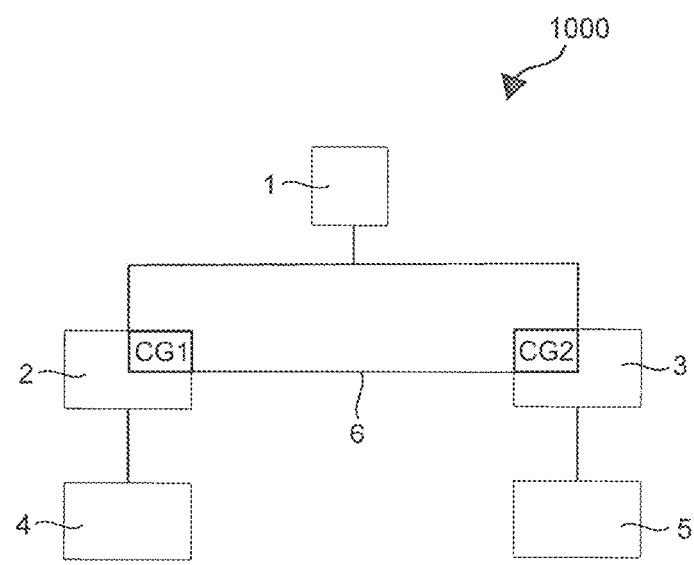
FIG. 1 shows a system 1000 according to a preferred embodiment of the invention. The system 1000 is preferably arranged completely in a vehicle, wherein the vehicle and further components are not shown for reasons of clarity.

The system 1000 comprises a superordinate control device 1, which is connected to a first inverter 2 and a second inverter 3 at least in terms of signal technology. The first inverter 2 is also at least power-electronically connected to a first electric machine 4 and the second inverter 3 is at least power-electronically connected to a second electric machine 5. According to the embodiment shown, in each case two inverters 2, 3 and two electric machines 4, 5, which are connected thereto in terms of signal technology, are provided, wherein the number of inverters and inverters connected thereto at least in terms of signal technology is variable.

The superordinate control device 1 is designed to output a power signal to the first inverter 2 and the second inverter 3, on the basis of which a first pulse-width modulated control signal having a first signal parameter is modulated by the first inverter 2 and output to the first electric machine 4 and a second pulse-width modulated control signal having a second signal parameter is modulated by the second inverter 3 and output to the second electric machine 5.

Furthermore, the first inverter 2 and the second inverter 3 are at least in terms of signal technology connected by a preferably bidirectional synchronization line 6. In this case, the first inverter is designed to transmit a synchronization signal, which comprises the first signal parameter of the first pulse-width modulated control signal, to the second inverter via the synchronization line 6. The synchronization line is preferably designed such that transmission of the synchronization signal in the nanosecond (ns) range is ensured. For example, the synchronization line is designed as a push-pull line, single-ended line or as a radio link. According to this embodiment, the first inverter 2 is provided as a master and the second inverter 3 is provided as a slave, wherein the pulse-width modulated control signal, which is output by the second inverter 3, is output by means of the synchronization signal with the first pulse-width modulated control signal, is synchronized by the first inverter 2 or the phase relationship or the phase shift is set.

Furthermore, the second inverter 3 is designed to modulate a third pulse-width modulated control signal having a third signal parameter on the basis of the received first signal parameter and a synchronization parameter and to output it instead of the second pulse-width modulated control signal, while the first pulse-width modulated control signal is continued to be output by the first inverter. The synchronization parameter preferably specifies a phase shift angle or a phase shift time which is predeterminable or adjustable, whereby a desired phase relationship or phase shift between the first pulse-width modulated control signal and the third pulse-width modulated control signal can be set.

FIGS. 2*a-d* show different preferred embodiments for arrangements of inverters and electric machines which can be used for the system according to the invention and which are suitable for carrying out the method according to the invention. The reference signs from FIG. 1 have been used analogously in FIGS. 2*a-d*, the statements regarding the system according to FIG. 1 being mutatis mutandis for the systems according to FIGS. 2*a-d*.

FIGS. 2*a-d* each show sections of the systems, comprising the electric machines 4, 5, the inverters 2, 3 and the synchronization lines 6.

Figure 2A:
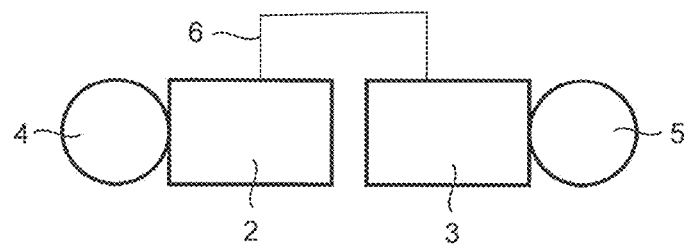

In this case, FIG. 2*a* shows a system with a first inverter 2 and a second inverter 3, wherein the first inverter 2 is power-electronically connected to a first electric machine 4 and the second inverter 3 is power-electronically connected to a second electric machine 5. The first and second inverters 2 and 3 are connected at least in terms of signal technology by means of a synchronization line 6. The first and second inverters 2 and 3 are arranged in separate housings and operate in separate intermediate circuits. Accordingly, it is possible to speak of two individual drives. This arrangement corresponds to the arrangement in FIG. 1

Figure 2B:
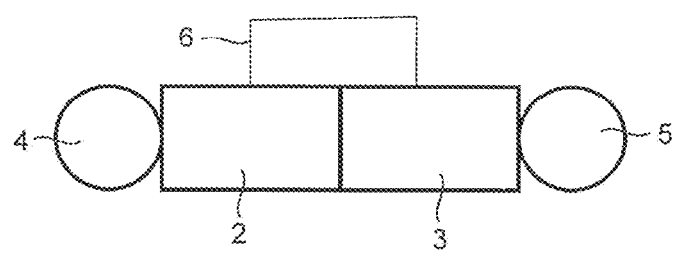

FIG. 2*b* shows a first inverter 2 and a second inverter 3, wherein the first inverter 2 is power-electronically connected to a first electric machine 4 and the second inverter 3 is power-electronically connected to a second electric machine 5. The first and second inverters 2 and 3 are connected at least in terms of signal technology by means of a synchronization line 6. The first and second inverters 2 and 3 are arranged in a common housing and operate in a common intermediate circuit. This can be an e-axis with two individual drives.

Figure 2C:
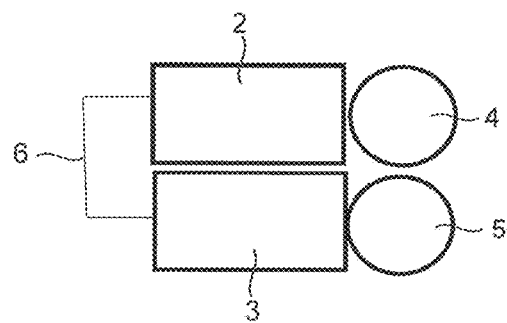

FIG. 2*c* shows a first inverter 2 and a second inverter 3, wherein the first inverter 2 is power-electronically connected to a first electric machine 4 and the second inverter 3 is power-electronically connected to a second electric machine 5. The first and second inverters 2 and 3 are connected at least in terms of signal technology by means of a synchronization line 6. The first and second inverters 2 and 3 are each arranged in a separate housing and operate in separate intermediate circuits. This can be two e-axes with one individual drive each on the front and on the rear axle.

Figure 2D:
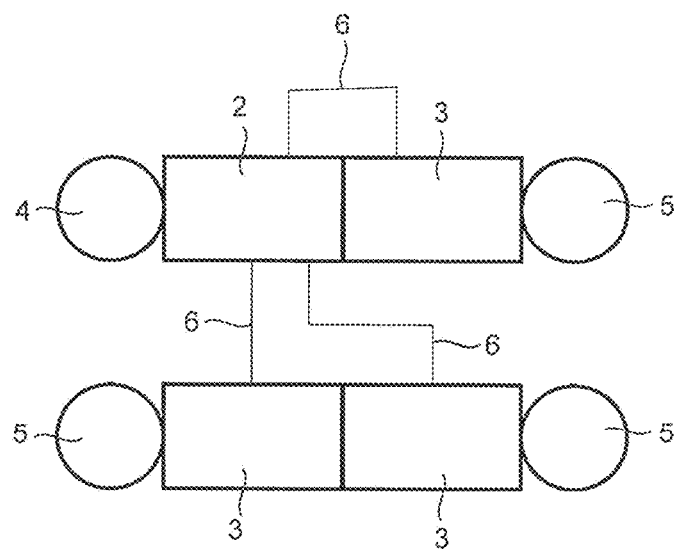
Figure 3:
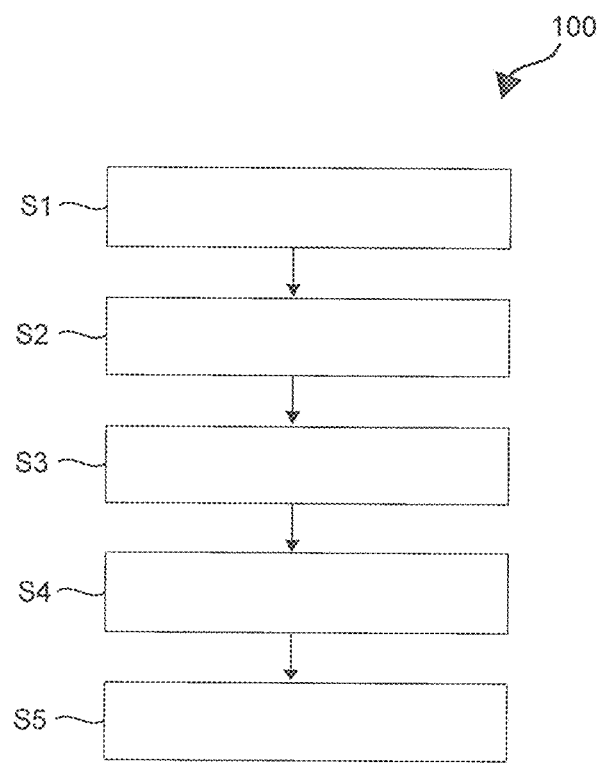
Figure 4:
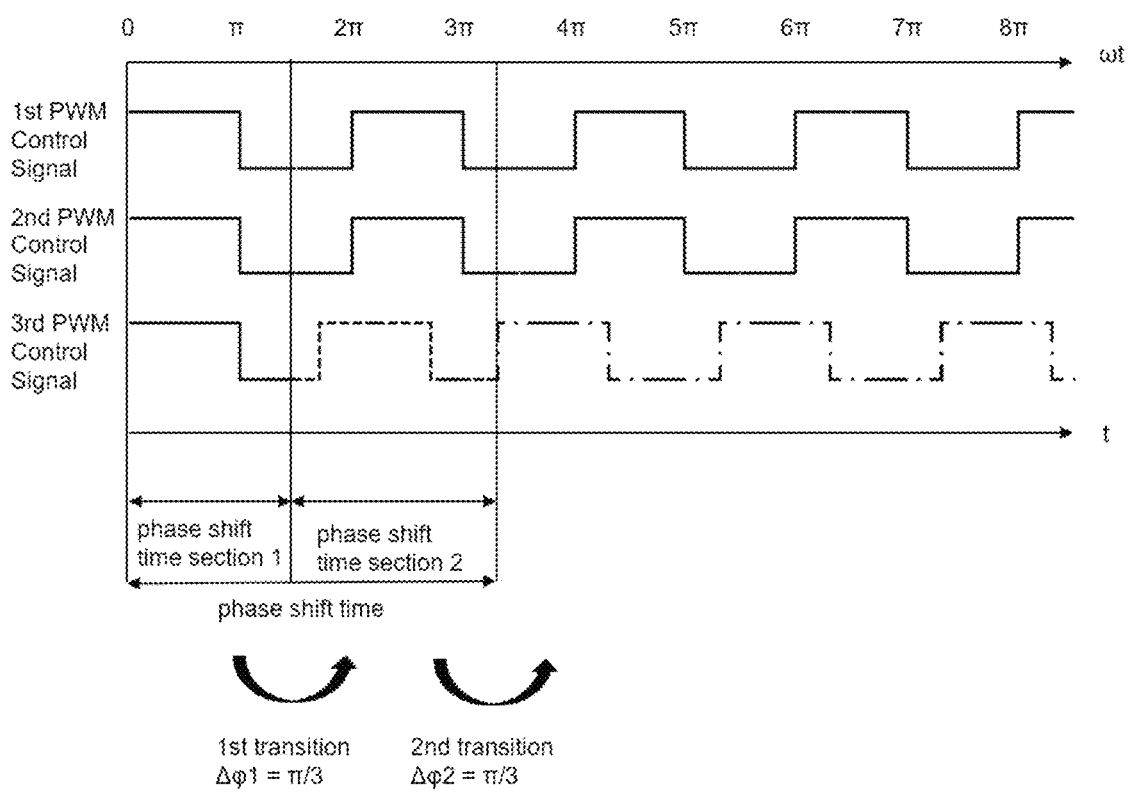
FIG. 4 is a schematic of $1^{st}$, $2^{nd}$, and $3^{rd}$ pulse-width modulated control signals with phase shift time sections and transitions.

FIG. 2*d* shows a first inverter 2 and three second inverters 3, wherein the first inverter 2 is power-electronically connected to a first electric machine 4 and the three second inverters 3 are each connected power-electronically to a second electric machine 5. The first inverter 2 is in each case connected to the three second inverters 3 by means of a synchronization line 6 at least in terms of signal technology. The first inverter 2 outputs the synchronization signal to each of the three second inverters 3. It would also be conceivable for the second inverters 3 to likewise be connected to one another by means of synchronization lines. This can be two e-axes with two individual drives each on the front and on the rear axle FIG. 3 shows a flowchart of a method 100 for controlling at least two electric machines 4, 5 arranged in a vehicle, according to a preferred embodiment of the invention.

In a step S1 corresponding to step a), a superordinate control device 1, preferably an engine controller, outputs a power signal which is received by a first inverter 2 and at least one second inverter 3.

In a subsequent step S2, corresponding to step b), based on the power signal or the data/parameters comprising the power signal, a first pulse-width modulated control signal having a first signal parameter is output by the first inverter 2 to a first electric machine 4 and a second pulse-width modulated control signal having a second signal parameter is output by the at least one second inverter 3 to a second electric machine 5.

In a step S3, corresponding to step c), a synchronization signal which comprises the first signal parameter is output from the first inverter 2 to the at least one second inverter 3 via a synchronization line 6 directly after or during step S2.

After step S3, according to a step S4, corresponding to step d), at least one third pulse-width modulated control signal having a third signal parameter is modulated by the at least one second inverter and output by the at least one second inverter instead of the second pulse-width modulated control signal. In this case, the third signal parameter is determined based on the first signal parameter and a predeterminable synchronization parameter. The synchronization parameter can preferably be available as stored information for the at least one second inverter or can be output directly from the superordinate control device 1 to the at least one second inverter 3 (for example via the power signal which can comprise the synchronization parameters), or possibly also indirectly via the first inverter 2, which transmits the synchronization parameter via the synchronization line 6 to the at least one second inverter 3 by means of the synchronization signal.

In a next step S5, according to step e), the at least one third pulse-width modulated control signal having the third signal parameter is output by the at least one second inverter 3 instead of the second pulse-width modulated control signal having the second signal parameter to the at least one second electric machine 5. By the modulation of the at least one third pulse-width modulated control signal with the third signal parameter based on the first signal parameter and the synchronization parameter, the phase relationship or the phase shift between the first and the at least one third pulse-width modulated control signal can be set or predetermined.

The various embodiments with all their features can be combined and exchanged as desired.

All the features disclosed in the application documents are claimed as essential to the invention provided that they are novel with regard to the prior art individually or in combination.

LIST OF REFERENCE SIGNS

100 method
1000 system
1 superordinate control device
2 first inverter
3 second inverter
4 first electric machine
5 second electric machine
6 synchronization line

The invention claimed is:

1. Method for controlling at least two electric machines arranged in a vehicle, preferably electric motors, comprising the steps of:
   a. Receiving a power signal output by a superordinate control device by a first inverter and at least one second inverter;
   b. Outputting a first pulse-width modulated control signal having a first signal parameter by the first inverter to a first electric machine and at least one second pulse-width modulated control signal having a second signal parameter by the at least one second inverter to at least one second electric machine, wherein the control signals are modulated based on the power signal;
   c. Outputting at least one synchronization signal comprising the first signal parameter by the first inverter to the at least one second inverter;
   d. Modulating at least one third pulse-width modulated control signal having a third signal parameter by the at least one second inverter, wherein the third signal parameter is determined based on the first signal parameter and a predeterminable synchronization parameter selected from a plurality of synchronization parameters as a function of at least one of: the power signal, the first pulse-width modulated control signal, and the second pulse-width modulated control signal, the plurality of synchronization parameters being retrievable stored information;
   e. Outputting the at least one third pulse-width modulated control signal having the third signal parameter by the at least one second inverter to the at least one second electric machine, wherein the first pulse-width modulated control signal and the at least one third pulse-width modulated control signal have a phase relationship that can be predetermined by the predeterminable synchronization parameter.

2. Method according to claim 1, wherein:
the predeterminable synchronization parameter is output by the superordinate control device to the at least one second inverter.

3. Method according to claim 1, wherein:
each one of the at least two electric machines has an associated power or load; and
at least one of a synchronization parameter or a value of a synchronization parameter is determined for the power or load associated with each one of the at least two electric machines, whereby a minimal ripple current is achieved.

4. Method according to claim 1, wherein:
the signal parameters and the predeterminable synchronization parameter represent a time value, wherein the signal parameters each indicate a time of an edge or a center point of the corresponding pulse-width modulated control signal and
wherein the predeterminable synchronization parameter specifies at least one of a phase shift time or a phase shift angle.

5. Method according to claim 4, wherein:
the synchronization parameter specifies a phase shift angle; and
the phase shift angle has a value in the range of ±180° or a value in the range of ±(90° to 120°).

6. Method according to claim 4, wherein:
the synchronization parameter specifies a phase shift time; and
the phase shift time is divided into at least two phase shift time sections, wherein steps d) and e) for each of the at least two phase shift time sections are performed individually one after the other in order to ensure a stepwise transition from the at least one second pulse-width modulated control signal to the at least one third pulse-width modulated control signal.

7. Method according to claim 1, wherein:
the first inverter and the at least one second inverter each have a clock generator, wherein the clock generator of the at least one second inverter—is tuned based on the first signal parameter and the predeterminable synchronization parameter before, during or after step d), in order to ensure a synchronous clock of the first inverter—and the at least one second inverter—for outputting the pulse-width modulated control signals.

8. Method according to claim 1, wherein:
the synchronization signal is output by the first inverter— to the at least one second inverter via a separate synchronization line, which connects the first inverter—and the at least one second inverter—in terms of signal technology, wherein the separate synchronization line is a push-pull line, a single-ended line or a radio link, and wherein a bidirectional connection is established between the first inverter—and the at least one second inverter via the separate synchronization line.

9. Method according to claim 1, wherein:
steps b) and c) take place simultaneously or immediately in succession.

10. Method according to claim 1, wherein:
the first inverter is operated at an adjustable switching frequency which is detected by the at least one second inverter and is adopted by the latter.

11. System for carrying out a method according to claim 1, comprising a first and at least one second electric machine, the superordinate control device, the first inverter and at least one second inverter, wherein the first inverter and the at least one second inverter are connected in terms of signal technology via a separate synchronization line.

12. Method according to claim 1, wherein:
a plurality of predeterminable synchronization parameters is used for determining the third signal parameter.

13. Method according to claim 1, wherein:
the signal parameters and the predeterminable synchronization parameter represent a time value, wherein the signal parameters each indicate a time of an edge or a center point of the corresponding pulse-width modulated control signal, and wherein the predeterminable synchronization parameter specifies a phase shift time or a phase shift angle.

14. Method according to claim 1, wherein:
the signal parameters and the predeterminable synchronization parameter represent a time value, wherein the signal parameters each indicate a time of an edge or a center point of the corresponding pulse-width modulated control signal, and wherein the predeterminable synchronization parameter specifies a phase shift time or a phase shift angle;
the phase shift angle has a value in the range of ±180° or a value in the range of ± (90° to 120°); and
the phase shift time is divided into at least two phase shift time sections, wherein steps d) and e) for each of the at least two phase shift time sections are performed individually one after the other in order to ensure a stepwise transition from the at least one second pulse-width modulated control signal to the at least one third pulse-width modulated control signal.

15. Method according to claim 1, wherein:
the first inverter and the at least one second inverter each have a clock generator, wherein the clock generator of the at least one second inverter is tuned based on the first signal parameter and the predeterminable synchronization parameter before, during or after step d), in order to ensure a synchronous clock of the first inverter and the at least one second inverter for outputting the pulse-width modulated control signals; and wherein
the synchronization signal is output by the first inverter to the at least one second inverter via a separate synchronization line, which connects the first inverter and the at least one second inverter-in terms of signal technology, wherein the separate synchronization line is a push-pull line, a single-ended line or a radio link, and wherein a bidirectional connection is established between the first inverter and the at least one second inverter via the separate synchronization line.

16. Method according to claim 1, wherein:
the synchronization parameters used for determining the third signal parameter are selected from the plurality of synchronization parameters as a function of at least two of: the power signal, the first pulse-width modulated control signal, and the second pulse-width modulated control signal.

17. Method according to claim 1, wherein:
the synchronization parameters used for determining the third signal parameter are selected from the plurality of synchronization parameters as a function of the power signal, the first pulse-width modulated control signal, and the second pulse-width modulated control signal.

* * * * *